UNITED STATES PATENT OFFICE.

CHARLES P. CROSSMAN, OF WEST WARREN, MASSACHUSETTS.

IMPROVEMENT IN MEDICINES FOR COUGHS, COLDS, &c.

Specification forming part of Letters Patent No. 115,032, dated May 23, 1871.

I, CHARLES P. CROSSMAN, of West Warren, Worcester county, Massachusetts, have invented a Medicine which I designate "Liquid Joy," and of which the following is a specification:

My medicine is in the nature of a liquid, to be applied externally and taken inwardly.

It is specially adapted to the cure of coughs, colds, neuralgia, headache, colic, pain in the side or back, piles, burns, cuts, bruises, chilblains, erysipelas, rheumatism, inflamed eyes, and, so far as known, of all ailments arising from the unwonted inflammation of any part of the system.

To prepare my medicine, take of fresh-laid hen's eggs, one dozen; thin sweet cream, (of cow's milk,) four quarts; alcohol, one quart; gum camphor, half ounce; oil of hemlock, half ounce; oil of sassafras, one ounce; and spirits of turpentine, one fourth ounce; and in the same proportion for greater or lesser quantities. Beat the eggs thoroughly, mix the cream and alcohol, then add the eggs, and, lastly, the camphor, hemlock, sassafras, and turpentine; stir all together, without heat, and put up in bottles tightly corked; to be shaken well before using.

Obviously the relative proportions of the ingredients just named may be somewhat varied, and I find from experiment that the turpentine may be entirely dispensed with; hence I do not propose to confine myself to the exact proportions named, though I deem them the best.

For burns, bruises, chilblains, piles, headache, neuralgia, and other ailments which may be considered as external, bathe with the medicine the parts affected freely until relief is obtained, then apply occasionally. For colds, lung and bowel complaints, and other ailments which may be considered internal, the medicine should be taken inwardly from two to six times per day, in doses varying from half a teaspoonful to a tea-spoonful. A little sugar renders it more palatable.

The action of my medicine on the class of diseases named, and for which it is especially adapted, is to allay the inflammation, relieve the pain usually consequent thereupon, and assist nature in restoring the diseased organs of the system to the performance of their normal and healthy functions.

What I claim as my invention is—

The medicine above specified.

CHARLES P. CROSSMAN.

Witnesses:
   F. BEMIS,
   C. H. CROSSMAN.